(12) United States Patent
West et al.

(10) Patent No.: US 8,355,747 B1
(45) Date of Patent: Jan. 15, 2013

(54) ENHANCED COVERAGE AND THROUGHPUT USING MULTIPLE WIRELESS TECHNOLOGIES

(75) Inventors: Barry West, Alexandria, VA (US); Alireza Afrashteh, Great Falls, VA (US); Masoud Olfat, Clarksville, MD (US); Douglas A. Hyslop, Vienna, VA (US); Rajesh M. Gangadhar, Ashburn, VA (US)

(73) Assignee: Nextel Communications Inc., Reston, VA (US)

(*) Notice: Subject to any disclaimer, the term of this patent is extended or adjusted under 35 U.S.C. 154(b) by 1478 days.

(21) Appl. No.: 11/440,000

(22) Filed: May 25, 2006

(51) Int. Cl.
  *H04M 1/00* (2006.01)
(52) U.S. Cl. ............... 455/552.1; 455/435.1; 455/435.2; 455/436; 455/443; 455/448; 455/561; 455/562.1
(58) Field of Classification Search ............... 455/435.1, 455/435.2, 436, 443, 448, 552.1, 561, 562.1
See application file for complete search history.

(56) References Cited

U.S. PATENT DOCUMENTS

| | | | | |
|---|---|---|---|---|
| 5,793,757 | A * | 8/1998 | Uddenfeldt | 370/335 |
| 5,826,188 | A * | 10/1998 | Tayloe et al. | 455/428 |
| 6,397,065 | B1 * | 5/2002 | Huusko et al. | 455/435.2 |
| 2002/0090975 | A1 * | 7/2002 | Laiho et al. | 455/552 |
| 2003/0035410 | A1 * | 2/2003 | Laroia et al. | 370/350 |
| 2004/0203777 | A1 * | 10/2004 | Watanabe et al. | 455/435.2 |
| 2004/0233888 | A1 * | 11/2004 | Bonta et al. | 370/350 |
| 2005/0147068 | A1 * | 7/2005 | Rajkotia | 370/338 |
| 2007/0155420 | A1 * | 7/2007 | Nagaraj et al. | 455/552.1 |

OTHER PUBLICATIONS

Dr. Seung Ku Hwang, VP, Mobile Telecommunication Research Division, "Introduction of 4G Activities in Korea", Jun. 21, 2005, IST Summit 2005 Dresden Jun. 19-23, 2005.

* cited by examiner

*Primary Examiner* — Olumide T Ajibade Akonai
*Assistant Examiner* — Jaime Holliday

(57) ABSTRACT

Systems and methods for dual wireless communication technology communications are provided. A mobile station communicates with two transceivers of a base site, where each transceiver operates according to a different wireless communication technology. The mobile station can communicate uplink and downlink control information with a first transceiver of the base site while also communicating uplink and downlink data with a second transceiver. Alternatively, the mobile station may transmit uplink transmissions only to a first transceiver and only receive downlink transmissions from a second transceiver.

19 Claims, 4 Drawing Sheets

ENHANCED COVERAGE AND THROUGHPUT USING MULTIPLE WIRELESS TECHNOLOGIES

BACKGROUND OF THE INVENTION

Wireless communication technology has advanced over the years, starting with analog communications technology and advancing to digital communications technology. This has paved the way for development of various wireless communication technology standards. These standards define air interface signaling protocols, duplexing modes of operation, core network architecture, multiple access technologies, and the like.

Each wireless communication standard has advantages and disadvantages relative to other wireless communication standards. Additionally, wireless communication standards require years to develop. This development may occur in stages, where interim standard drafts are issued allowing some features, leaving other features to additional interim drafts or the final standard.

SUMMARY OF THE INVENTION

Recognizing the advantages and disadvantages of different wireless communication standards and the fact that standards may be in various stages of development, the present invention provides systems and methods in which a mobile station communicates with a base site using different wireless communication technologies. In accordance with exemplary embodiments of the present invention, a mobile station communicates with a first transceiver of a base site using a first wireless communication technology and communicates with a second transceiver of the base site using a second wireless communication technology. These technologies can use different air interface protocols, duplexing modes of operation, multiple access technologies and/or signaling protocols.

Exemplary embodiments of the present invention are particularly advantageous for wireless network operators that have deployed a wireless communication technology and want to use its benefits to reduce cost and complexity of enhanced wireless broadband services. For example, many major U.S. wireless network operators that have already deployed either 3GPP2 EV-DO or WCDMA technology in one of their spectrums can use the present invention to extend their deployment to provide higher capacity to their customers.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
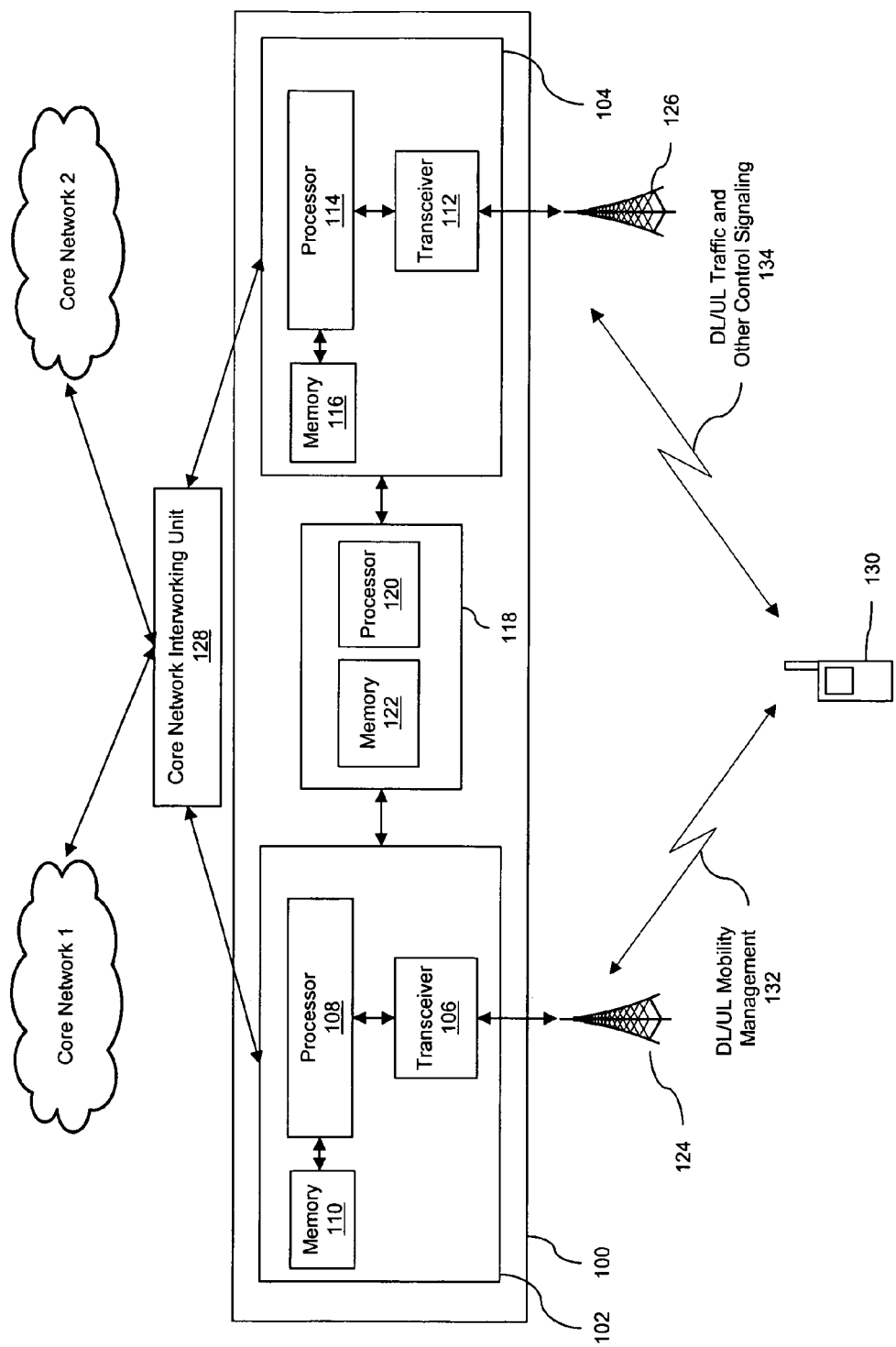
FIG. 1 is a block diagram of an exemplary system in accordance with a first aspect of the present invention.

FIG. 1 is a block diagram of an exemplary system in accordance with a first aspect of the present invention. The system includes a base site 100 with a first base station 102 and a second base station 104. The first base station 102 includes one or more transceivers 106, processor 108 and memory 110. The second base station 104 includes one or more transceivers 112, processor 114 and memory 116. Base site 100 also includes an interworking unit 118, which is coupled to base stations 102 and 104. Interworking unit 118 includes processor 120 and memory 122. Base station 102 is coupled to one or more antennas 124, and base station 104 is coupled to one or more antennas 126. Base stations 102 and 104 are also coupled to core network interworking unit 128, which in turn is coupled to core networks 1 and 2.

In accordance with exemplary embodiments of the present invention, base stations 102 and 104 operate according to different wireless communication technologies that can employ different air interface protocols, duplexing modes of operation, multiple access technologies and/or signaling protocols. For example, base station 102 can operate using single carriers modulation as the air interface protocol, frequency division duplexing (FDD) as the duplexing mode of operation, CDMA as a multiple access protocol and IS-95 as a signaling protocol, while base station 104 can operate using OFDM as the air interface protocol, time division duplexing (TDD) as the duplexing mode of operation, OFDMA as a multiple access protocol and WiMAX signaling protocol. Other features that may be different between two technologies include handoff protocols, high mobility support, convenience to employ advanced antenna technologies (e.g., multiple input multiple output (MIMO) and beamforming), coverage area, ranging, power control, access mechanisms and the like. Although particular air interface protocols, duplexing modes of operation, multiple access technologies and signaling protocols have been identified for existing wireless communication standards, the present invention can employ any combination of air interface protocols, duplexing modes of operation, multiple access technologies and signaling protocols. Regardless of the signaling protocols employed, each of the core networks 1 and 2 will operate according to the signaling protocols of one of the base stations 102 and 104, as will be described in more detail below.

As illustrated in FIG. 1, mobile station 130 communicates downlink and uplink (DL/UL) mobility management information with base station 102 and DL/UL traffic and all other control signaling with base station 104. In accordance with one aspect of the present invention, mobile station 130 communicates mobility management information required by wireless communication technology 2 with base station 102, which operates according to a different wireless communication technology (technology 1). In this arrangement mobile station 130 performs carrier-to-interference ratio (C/I) and other measurements for mobile assisted mobility management required by wireless communication technology 2 and communicates this information to base station 102 using wireless communication technology 1. Base station 102 can monitor the air interface with mobile station 130 using wireless communication technology 1. Base station 104 sends uplink measurements and loading/interference information to base station 102 via interworking unit 118, which performs any necessary translation of the information between the two wireless communication technologies.

Using the information provided by base station 104, base station 102 then makes any necessary handover decisions and directs mobile station 130 to a new cell by providing a cell identification to the mobile station 130 and by requesting allocation of radio resources from a first and second base station in the new cell. Mobile station 130 confirms its transition to the new cell by sending signaling on the uplink using technology 1 to base station 102. The mobile station 130 then begins to communicate with a technology 1 and technology 2 base station in the new cell. Core network interworking unit 128 receives information from base stations 102 and 104 and provides the information to the appropriate core network. For example, base station 102 can provide information related to the handoff to core network interworking unit 128, which in turn performs any necessary translations and forwards the information to core network 2, which operates according to wireless communication technology 2. For example, the information can be a location update for a location register in core network 2.

The arrangement of FIG. 1 is particularly advantageous when technology 2 provides higher bandwidth but has a limited mobility management ability. For example, mobility management in WiMAX is still being developed. Accordingly, using the present invention the high bandwidth provided by WiMAX can be employed while another wireless communication technology that has a mature mobility management structure (e.g., EV-DO rev. A) can be employed for mobility management.

Figure 2:
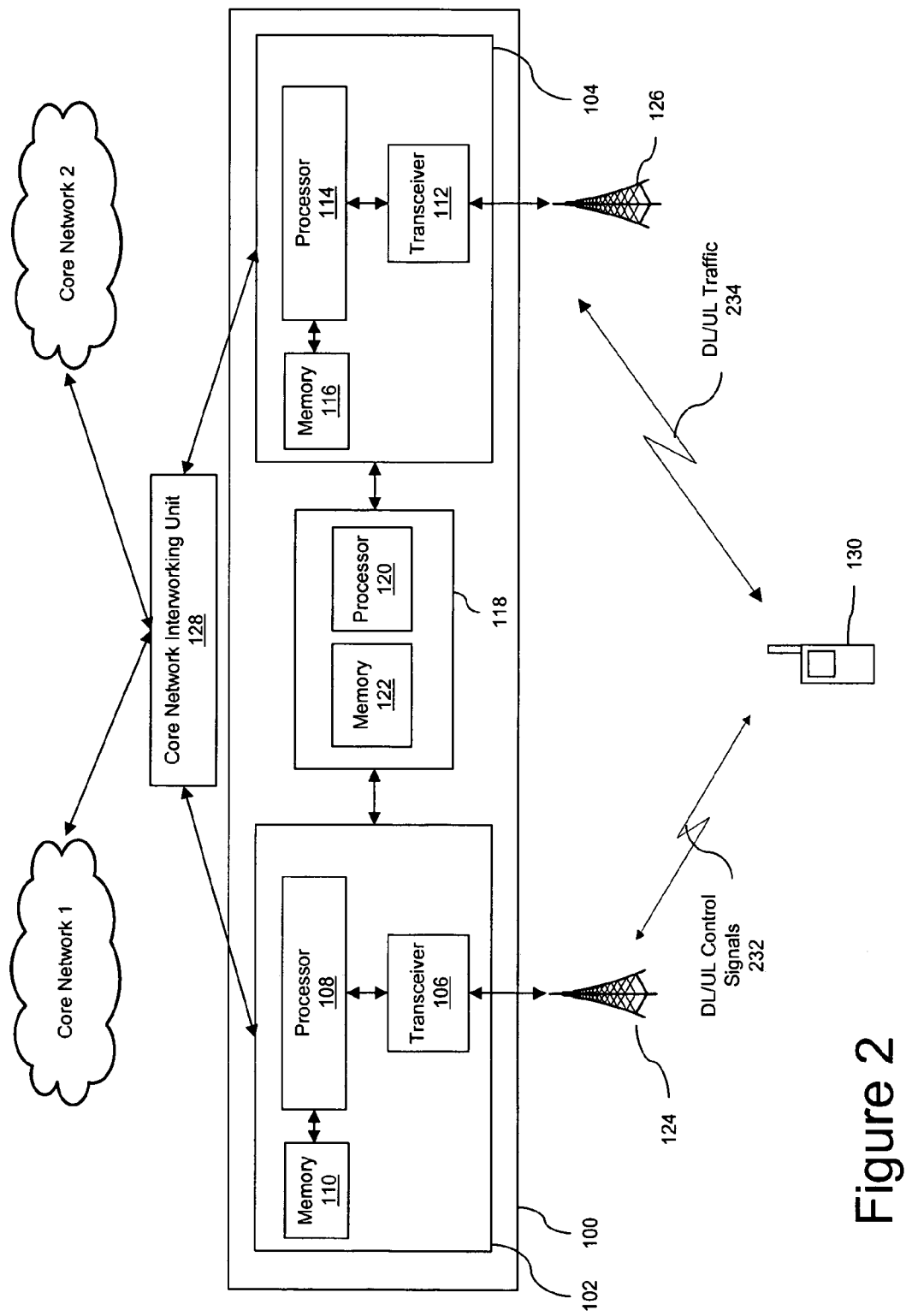
FIG. 2 is a block diagram of an exemplary system in accordance with a second aspect of the present invention.

FIG. 2 is a block diagram of an exemplary system in accordance with a second aspect of the present invention. FIG. 2 includes similar elements to those discussed above, and operate in a similar manner to that described above. The differences between FIGS. 1 and 2 is the type of information communicated between mobile station 130 and base stations 102 and 104. In FIG. 2 mobile station 130 communicates all control signaling in the uplink and downlink with base station 102 and all data traffic in the uplink and downlink with base station 104. The control signaling can include mobility management, power control, authentication, radio resource management, and the like. The arrangement in FIG. 2 may be advantageous when wireless communication technology 2 has a large signaling overhead. For example, some wireless technologies such as WiMAX suffer from a high medium access control (MAC) overhead, mostly resulting from control signaling. Accordingly, using technology 1 for control signaling takes advantage of the greater signaling efficiency provided by wireless communication technology 1, while still taking advantage of the higher throughput for data provided by wireless communication technology 2.

Figure 3:
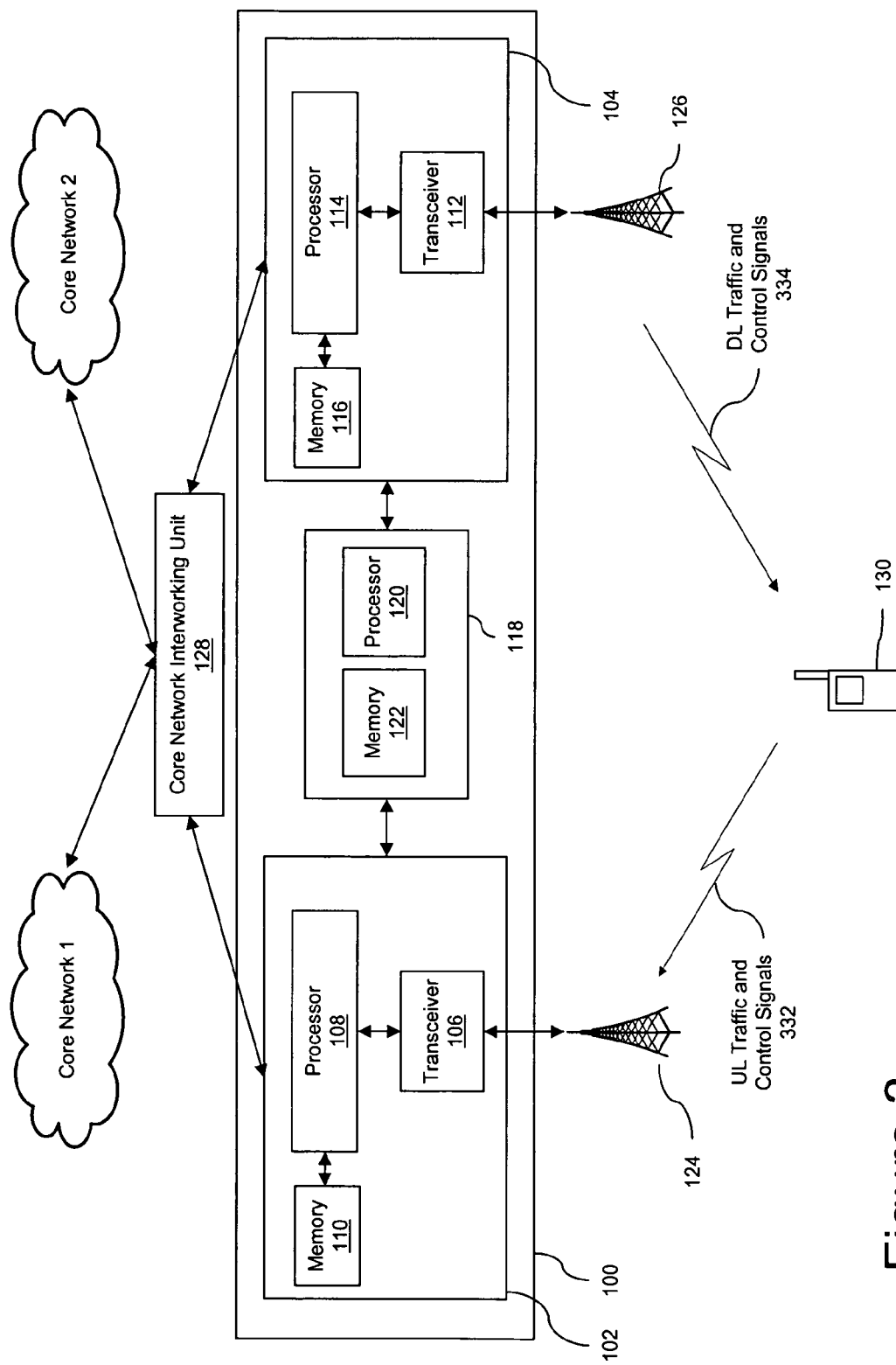
FIG. 3 is a block diagram of an exemplary system in accordance with a third aspect of the present invention.

FIG. 3 is a block diagram of an exemplary system in accordance with a third aspect of the present invention. Elements in FIG. 3 which have been previously described in connection with FIGS. 1 and 2 provide similar functions to that described above. In the arrangement of FIG. 3, mobile station 130 transmits all uplink control signaling and traffic with base station 102 using wireless communication technology 1, while receiving all downlink control signaling and traffic from base station 104. The arrangement of FIG. 3 minimizes the complexity and cost of the mobile station transmitter, maximizes cell site coverage range and leverages the different channel bandwidths provided by different wireless technologies.

Regarding minimizing device complexity and cost, different wireless technologies require different transmitted peak-to-average power ratios (PAPR). For example, technologies that increase throughput in a frequency selective environment, such as OFDM-based wireless technologies, suffer from a high PAPR. On the other hand, CDMA-based technologies provide acceptable interference suppression capabilities especially for the mobile stations close to the cell edge, and do not suffer from the PAPR problem, but tend to be limited in downlink sector throughput. Accordingly, by employing OFDM-based technologies in the downlink and CDMA-based technologies in the uplink, the transmitters required to provide a high PAPR can be implemented in the base station, while allowing less costly transmitters that may not provide such a high PAPR to be employed by mobile stations.

Regarding maximizing cell site coverage range, the link budget of the uplink employed by so-called "next-generation technologies" such as WiMAX, tends to be a challenge given the greater noise level in the larger channel bandwidths required to support the higher data rates. The downlink is more flexible since the base station may employ a more powerful power amplifier to close the gap, but battery life concerns and specific absorption rate (SAR) considerations limit the power amplifier output of mobile stations. In accordance with one aspect of the present invention the uplink link budget can be improved by leveraging a lower frequency band for the uplink. The lower frequency band, such as 700 MHz or 1900 MHz, offers more favorable RF propagation than the higher downlink frequency band (e.g., 2.5 GHz), helping to close the loop without increasing the device transmit power.

Regarding the different channel bandwidths provided by the different wireless technologies, wireless communications typically have asymmetric traffic demands, such that the downlink requires more bandwidth than the uplink. Frequency division duplexing systems have traditionally been allocated equal amounts of spectrum for uplink and downlink, translating to similar data throughputs in the two links. Some broadband data applications are heavily downlink-biased. In accordance with one aspect of the present invention, imbalanced frequency pairs are employed for frequency division duplexing, providing asymmetric data throughput through different channel bandwidths for uplink and downlink. A further side benefit of providing a smaller channel bandwidth in the uplink is an additional link budget improvement relative to the downlink. This is particularly useful since most techniques are uplink-limited in determining the coverage area.

Figure 4:
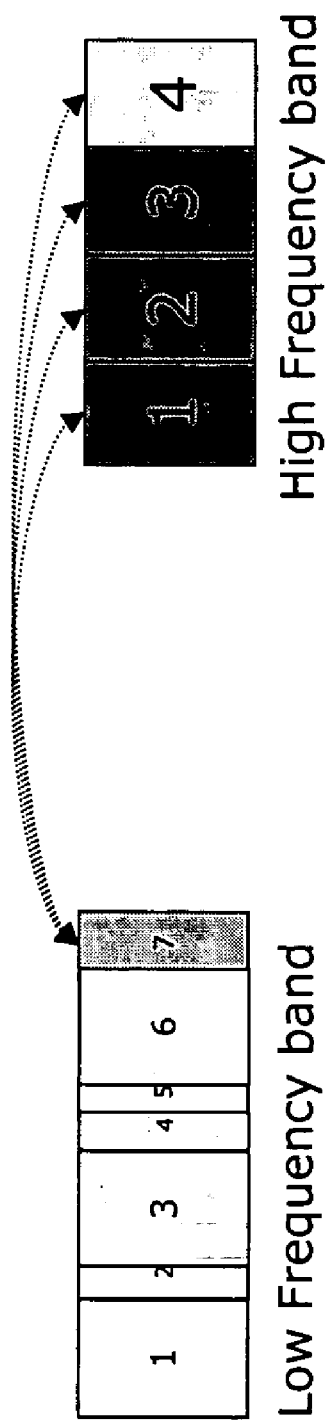
FIG. 4 is a block diagram of an exemplary channel allocation arrangement in accordance with the present invention.

FIG. 4 depicts one potential spectrum usage model for base stations 102 and 104, supporting different technologies in the uplink and downlink. The downlink generated by base station 104 can use any of the block number 1, 2, 3, 4 or any aggregation of these blocks in high frequency band, while the block number 7 in the low frequency band is used solely for the uplink transmission to base station 102. An example of high frequency band could be the 2.5 GHz spectrum, and blocks 1, 2, 3, and 4 could represent blocks E, F, H, or G in that band. An example of the low frequency band could be the 1.9 GHz (PCS) band and block 7 could represent G block in PCS band. Another example of low frequency band could be the 700 MHz or 450 MHz spectrum. It should be recognized that other frequency bands and arrangement of blocks within frequency bands can be employed with the present invention.

The system illustrated in FIG. 3 is particularly advantageous for a multicast broadcast service (MBS). In this type of service the main transmission load occurs on the downlink, while a low throughput uplink is used for registration, billing, and authentication purposes. A very narrow bandwidth in the uplink could be enough to support these uplink services. For these types of applications, even a CDMA 1x technology would suffice for the uplink.

It should be recognized that depending upon the two different wireless communication technologies employed at a base site, some modifications may be required for each technology. For example, if the 2.5 GHz technology is selected to be WiMAX, the uplink (UL) MAP structure should be changed to allocate CDMA time slots to uplink traffic rather than OFDMA bands or subchannels. Also, the ranging mechanism to maintain the link quality and time synchronization between the base station and mobile station as the mobile station traverses the cell should be modified. The feedback mechanism may also need to be modified. For example, the feedback mechanism of WiMAX is based on CQICH channels dedicated to mobile stations, and facilitates the SINR feedback, channel estimation feedback, multiple input multiple output (MIMO) and beamforming operation.

One aspect of the present invention has an additional advantage over how a TDD system achieves the asymmetric traffic allocation in 2.5 GHz. In TDD systems the same downlink/uplink ratio is typically defined for all sites in the system to avoid intra-system interference. In accordance with this aspect of the present invention, by employing different frequency bands for the uplink and downlink communications the asymmetry may be defined on a site-by-site basis, and varying by time or by user, as needed by the traffic demand.

The present invention has been described in connection with various elements comprising processors and memories. These processors can include a microprocessor, application specific integrated circuit (ASIC), field programmable gate array (FPGA), and/or the like. The memories can be any type of memory including read only memory, random access memory, flash memory, a hard disk, and/or the like. The memory can store, in addition to other information, computer-readable program code for execution by the processor in order to perform the functions described herein.

Although exemplary embodiments have been described in connection with a single mobile station and a single base site, the present invention is equally applicable to systems supporting more than one mobile station and/or more than one base site.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for wireless communications, the method comprising:
    establishing, by a communication system, a communication session between a mobile station, a first base station of a base site of the communication system and a second base station of the base site of the communication system;
    communicating, by the mobile station, a first type of information of the communication session with the first base station of the base site using an uplink channel of a first wireless communication protocol, and
    communicating, by the mobile station, a second type of information of the communication session with the second base station of the base site using a downlink channel of a second wireless communication protocol,
    wherein the communication session consists of the first type of information and the second type of information,
    wherein the first type of information further comprises registration, billing, and authentication information associated with the communication session and the second type of information comprises multicast broadcast service data traffic associated with the communication session.

2. The method of claim 1, wherein the first type of information comprises control signaling information of the communication session.

3. The method of claim 2, wherein the second type of information comprises data traffic of the communication session.

4. The method of claim 3, wherein the mobile station communicates contemporaneously with the first and second base stations.

5. The method of claim 3, further comprising:
    providing information by the first and second base stations to a protocol interworking unit;
    translating, by the protocol interworking unit, the information provided by the first and second base stations; and
    providing the translated information to the first and second base stations.

6. The method of claim 3, further comprising:
    providing information by the first and second base stations to a core network interworking unit; and
    providing, by the core network interworking unit, information received from the first and second base stations to a first and second core network.

7. The method of claim 1, wherein communicating the first type of information with the first base station comprises transmitting to the first base station control information and data associated with the communication session, and communicating the second type of information with the second base station comprises receiving from the second base station control information and data associated with the communication session.

8. The method of claim 7, further comprising:
    providing information by the first and second base stations to a protocol interworking unit;
    translating, by the protocol interworking unit, the information provided by the first and second base stations; and
    providing the translated information to the first and second base stations.

9. The method of claim 7, further comprising:
    providing information by the first and second base stations to a core network interworking unit; and
    providing, by the core network interworking unit, information received from the first and second base stations to a first and second core network.

10. The method of claim 1, wherein the first and second wireless communication protocols operate according to different air interface protocols.

11. The method of claim 10, wherein the first and second wireless communication protocols include different multiple access protocols.

12. The method of claim 11, wherein the different multiple access protocols are selected from the group consisting of time division multiple access, frequency division multiple access, code division multiple access, and orthogonal frequency division multiple access.

13. The method of claim 10, wherein the first and second wireless communication protocols include different signaling protocols.

14. The method of claim 13, wherein each of the different signaling protocols include protocols related to ranging, power control, and network access.

15. The method of claim 1, wherein the mobile station communicates with the first base station over a first frequency band and the mobile station communicates with the second base station over a second frequency band.

16. The method of claim 15, wherein the first and second frequency bands are licensed frequency bands.

17. The method of claim 1, further comprising:
    providing information by the first and second base stations to a protocol interworking unit;

translating, by the protocol interworking unit, the information provided by the first and second base stations; and providing the translated information to the first and second base stations.

18. The method of claim 1, further comprising:

providing information by the first and second base stations to a core network interworking unit; and providing, by the core network interworking unit, information received from the first and second base stations to a first and second core network.

19. The method of claim 18, wherein the first and second core networks operate according to different signaling protocols.

* * * * *